US008798626B2

(12) United States Patent
Jeon

(10) Patent No.: US 8,798,626 B2
(45) Date of Patent: Aug. 5, 2014

(54) HANDOVER CONTROL APPARATUS AND OPERATION METHOD OF HANDOVER CONTROL APPARATUS

(75) Inventor: Paul Barom Jeon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 556 days.

(21) Appl. No.: 12/042,379

(22) Filed: Mar. 5, 2008

(65) Prior Publication Data

US 2009/0124258 A1 May 14, 2009

(30) Foreign Application Priority Data

Nov. 9, 2007 (KR) .................. 10-2007-0114473

(51) Int. Cl.
*H04W 36/00* (2009.01)
*H04W 4/00* (2009.01)

(52) U.S. Cl.
USPC .......................................... 455/436; 370/328

(58) Field of Classification Search
USPC ................... 455/442, 436; 370/331
See application file for complete search history.

(56) References Cited

U.S. PATENT DOCUMENTS

| 6,360,098 B1* | 3/2002 | Ganesh et al. ................. 455/436 |
| 2005/0197126 A1* | 9/2005 | Kang et al. .................... 455/442 |
| 2005/0232199 A1* | 10/2005 | Liu et al. ....................... 370/331 |
| 2007/0064650 A1* | 3/2007 | Lohtia et al. .................. 370/331 |
| 2008/0225797 A1* | 9/2008 | Kim .............................. 370/331 |

FOREIGN PATENT DOCUMENTS

| JP | 09-233521 | 9/1997 |
| JP | 2005-012429 | 1/2001 |
| KR | 1999-0084579 A | 12/1999 |
| KR | 1020010053883 A | 7/2001 |
| KR | 1020010064373 A | 7/2001 |
| KR | 2001-0102555 | 11/2001 |
| KR | 1020030028237 A | 4/2003 |
| KR | 10-2006-0013058 A | 2/2006 |
| KR | 10-0567226 B1 | 3/2006 |
| KR | 10-0594116 B1 | 6/2006 |
| KR | 10-2007-0078090 A | 7/2007 |

OTHER PUBLICATIONS

Korean Office Action issued Jul. 31, 2012 in counterpart Korean Application No. 10-2007-0114473 (4 pages, in Korean).

* cited by examiner

*Primary Examiner* — Michael Faragalla
(74) *Attorney, Agent, or Firm* — NSIP Law

(57) ABSTRACT

A handover control apparatus and an operation method of a handover control apparatus are provided. The handover control apparatus includes an information identification unit which ascertains movement direction information of a terminal and location information of a plurality of neighboring RASs adjacent to the terminal and a scanning order determination unit which determines a scanning order for a handover with respect to the plurality of neighboring RASs using the movement direction information of the terminal and the location information of the plurality of neighboring RASs.

24 Claims, 6 Drawing Sheets

HANDOVER CONTROL APPARATUS AND OPERATION METHOD OF HANDOVER CONTROL APPARATUS

CROSS-REFERENCE TO RELATED APPLICATION

This application claims the benefit under 35 U.S.C. §119(a) of a Korean Patent Application No. 10-2007-0114473, filed on Nov. 9, 2007, in the Korean Intellectual Property Office, the entire disclosure of which is incorporated herein by reference.

TECHNICAL FIELD

The following description relates to a wireless communication system, and more particularly, to methods and apparatuses for implementing a handover in wireless communication system.

BACKGROUND

Telecommunication devices are frequently handed off from one base station to another and/or from one carrier to another. A terminal may roam through coverage areas of several cells and therefore may be handed off from one base station to another as the terminal travels through the associated cells or sectors, and the coverage area associated with a base station and/or a carrier may vary due to changing environmental conditions and changing network configurations. Where a terminal moves from one cell to another cell in a mobile communication network, a handover is offered to the device in order to allow smooth and seamless transition between the cells. Typically, a handover in a wireless communication network includes a soft handover and a hard handover.

In the case of a soft handover, where a terminal communicates using a plurality of channels in an area where at least two cells are overlapped and a channel quality of one cell decreases to are reference value, a connection of the channel between the terminal and the one cell may be disconnected. In the case of a hard handover, where a terminal moves among cells, a connection with a previous cell may be disconnected and a connection with a subsequent cell adjacent to the previous cell may be necessarily performed.

Where strength of a received pilot signal is lower than a reference value or where a request from a base station is received, a terminal collects information about cells adjacent to the terminal and reports the information to a base station. An operation of searching information about neighboring cells described above is referred to as a cell searching. In this instance, the information reported to the base station is used for a handover.

As described above, an operation where a terminal scans base stations adjacent to the terminal is necessarily required so that a handover is performed. However, where the handover is frequently requested, a wireless resource for the handover may be wasted.

SUMMARY

In one general aspect, there is provided a method and handover control apparatus for providing scanning order information of a wireless communication network. The scanning order information may be used to prevent unexpected interruption of communication and a wireless resource for the handover from being wasted. The scanning order information for a handover with respect to neighboring stations may indicate a location of each of the neighboring stations and a movement direction of a terminal.

In another general aspect, there is provided a handover control apparatus and a method of a handover control apparatus which sequentially scans neighboring stations until a single or a predetermined number of candidate stations satisfying a handover condition are detected. Accordingly, a wireless resource for a scanning process may be efficiently used.

In still another general aspect, a handover control apparatus includes: an information identification unit to ascertain movement direction information of a terminal and location information of a plurality of neighboring radio access stations (RASs) adjacent to the terminal; and a scanning order determination unit to determine a scanning order for a handover with respect to the plurality of neighboring RASs using the movement direction information of the terminal and the location information of the plurality of neighboring RASs.

In yet another general aspect, a method of a handover control apparatus includes: ascertaining movement direction information of a terminal and location information of a plurality of neighboring RASs adjacent to the terminal; and determining a scanning order for a handover with respect to the plurality of neighboring RASs using the movement direction information of the terminal and the location information of the plurality of neighboring RASs.

Other features and aspects may be apparent to those skilled in the art from the following detailed description, the attached drawings, and the claims.

BRIEF DESCRIPTION OF THE DRAWINGS

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods and systems described herein. According, various changes, modifications, and equivalents of the systems and methods described herein will be suggested to those of ordinary skill in the art. Also, description of well-known functions and constructions are omitted to increase clarity and conciseness.

Figure 1:
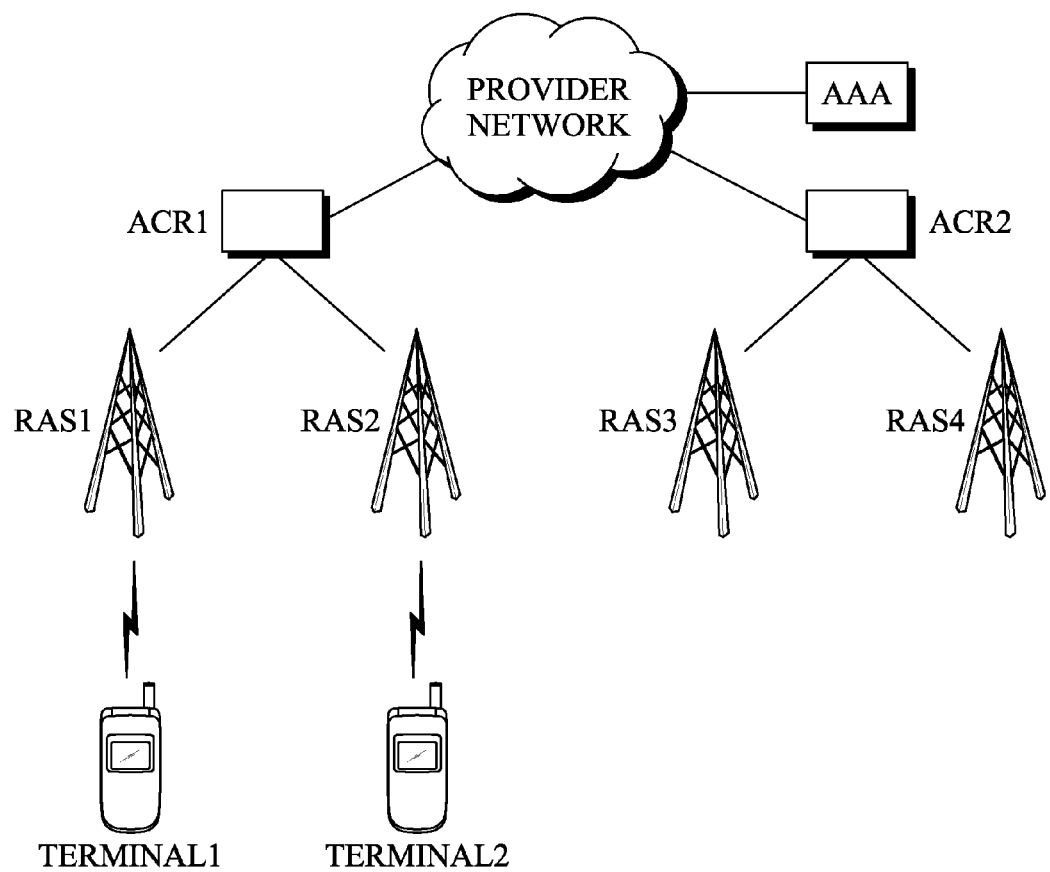
FIG. 1 is a configuration diagram illustrating an example of a wireless communication system.

FIG. 1 illustrates an example of a wireless communication system.

An example of a handover control apparatus and an example of an operation method of a handover control apparatus described herein may be applied to a variety of communication systems. As one example of an application, a handover control apparatus and an operation method of a handover control apparatus will be described in association with a Wireless broadband (Wibro) communication system with reference to FIG. 1.

As illustrated in FIG. 1, the wireless communication system includes a plurality of terminals, that is, terminal 1 and terminal 2, a plurality of radio access stations (RASs), that is, RAS1, RAS2, RAS3, and RAS4, a plurality of access control router (ACRs), that is, ACR1 and ACR2, and an Authentication, Authorization and Accounting (AAA) server.

As a non-limiting illustration, a terminal may be a notebook, personal computer (PC), a personal digital assistant (PDA), a smart phone, a Navigation/Telematics terminal, a Wibro terminal, and the like, including a module providing location information such as a global positioning system (GPS) and Galileo. The terminal may recognize a location and a path of the terminal and a location of a neighboring RAS.

RAS1, RAS2, RAS3, and RAS4 may manage and control a wireless resource and support a handover. Also, ACR1 and ACR2 may perform an access control and various operations for routing. The AAA server may perform a variety of operations associated with an authentication, authorization, and accounting.

As illustrated in FIG. 1, RAS1 is a serving RAS of the terminal 1. RAS2, RAS3, and RAS4 are neighboring RASs of the terminal 1. When moving to a cell area of RAS3 from a cell area of RAS1, the terminal 1 is handed over from RAS1 to RAS3 so as not to interrupt a provided service.

The terminal 1 may scan the neighboring RASs, that is, RAS2, RAS3, and RAS4, for the handover. In this instance, as a moving speed of the terminal 1 increases, a number of times that the handover is performed and a number times that the scanning is performed increase. Accordingly, a repeated scanning may be performed. Due to the repeated scanning, various wireless resources such as a bandwidth, electric power, and the like, may be wasted, and a signal processing rate may be deteriorated.

Figure 2:
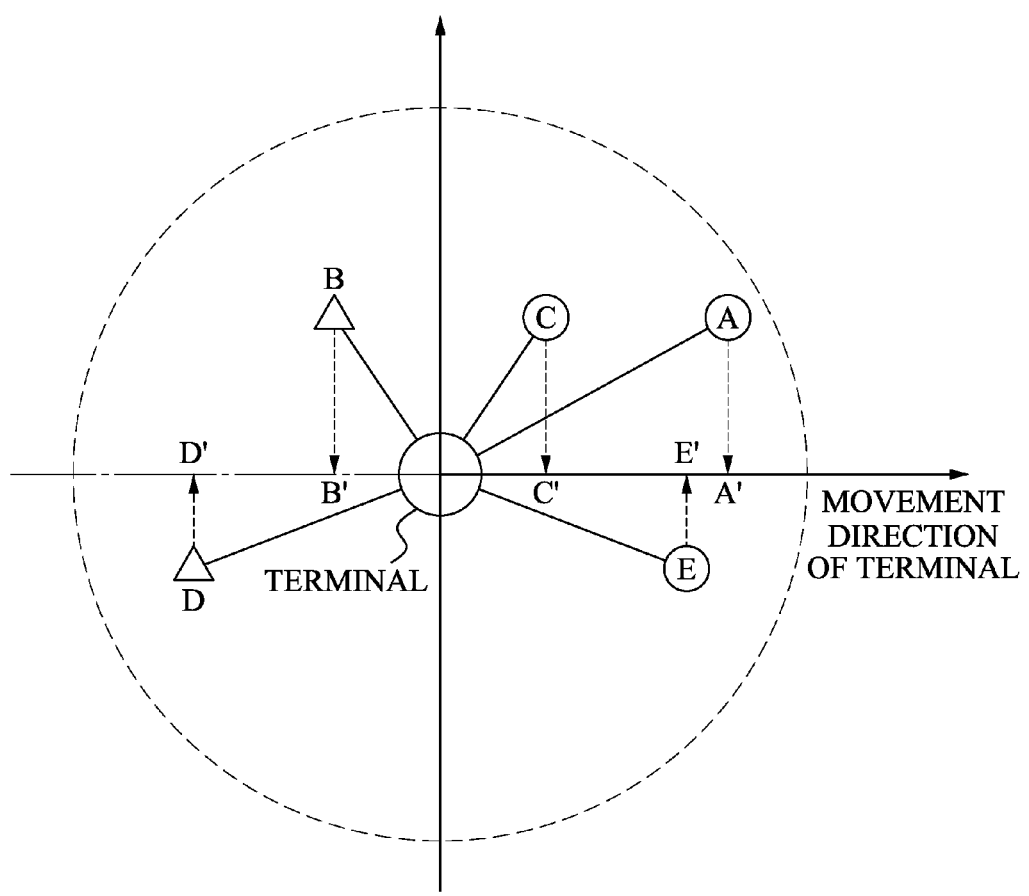
FIG. 2 is a diagram illustrating an example of a method of selecting a handover radio access station (RAS)

FIG. 2 illustrates an example of a method of selecting a handover RAS.

A terminal and a plurality of neighboring RASs A, B, C, D, and E are illustrated in FIG. 2.

The terminal may scan at least one neighboring RAS for a handover. In this instance, according to a general aspect, the terminal may determine a scanning order according to a movement direction of the terminal and a location of each of the neighboring RASs A, B, C, D, and E. Thus, the terminal may sequentially scan the neighboring RASs A, B, C, D, and E according to a predetermined scanning order, and may not scan one or more of the neighboring RASs A, B, C, D, and E. For example, where the scanning order is determined in an order of A, E, C, B, and D, the terminal may not scan the neighboring RAS B and neighboring RAS D after scanning the neighboring RAS A, neighboring RAS E, and neighboring RAS C.

Where the movement direction of the terminal is in a direction indicated by an arrow illustrated in FIG. 2, the location of each of the neighboring RASs A, B, C, D, and E may be projected onto an axis corresponding to the movement direction of the terminal. Also, where it is assumed that a location of the terminal is an origin (0, 0), each projection value, generated by projecting the location of each of the neighboring RASs A, B, C, D, and E onto the axis corresponding to the movement direction of the terminal, is A', B', C', D' and E'. In this instance, the projection value A', projection value C', and projection value E', located in a same direction as the movement direction of the terminal from the origin (0, 0), have a positive value (+), while the projection value B' and projection value D', located in an opposite direction to the movement direction of the terminal from the origin (0, 0), have a negative value (−).

The terminal may determine neighboring RASs located in the same direction with respect to the movement direction of the terminal, that is, the neighboring RAS A, neighboring RAS C, and neighboring RAS E, using the generated projection values A', B', C', D' and E'. Accordingly, the terminal may scan the neighboring RAS A, neighboring RAS C, and neighboring RAS E, located in the same direction as or corresponding to the movement direction of the terminal, prior to the neighboring RAS B and neighboring RAS D.

As a distance from the terminal to a target handover RAS increases, a number of times that the terminal performs a handover may decrease. Accordingly, the terminal may scan the neighboring RASs A, B, C, D and E in an order of nearest to farthest from the terminal. In this instance, the target handover RAS refers to an RAS selected as a target of handover from among the neighboring RASs A, B, C, D and E.

Accordingly, the terminal may determine the scanning order in the order of A, E, C, B, and D by considering a size and a sign of the projection values A', B', C', D' and E'. That is, the terminal may determine the scanning order based on where neighboring RASs are located with respect to the movement direction of the terminal, and in the order of nearest to farthest from the terminal. Thus, where a scanning process is set in advance to be continued until the terminal detects a single candidate RAS, and the terminal determines that the neighboring RAS A is the target handover RAS satisfying the handover condition after scanning the neighboring RAS A, the terminal may not scan the neighboring RAS E, neighboring RAS C, neighboring RAS B, and neighboring RAS D.

Figure 3:
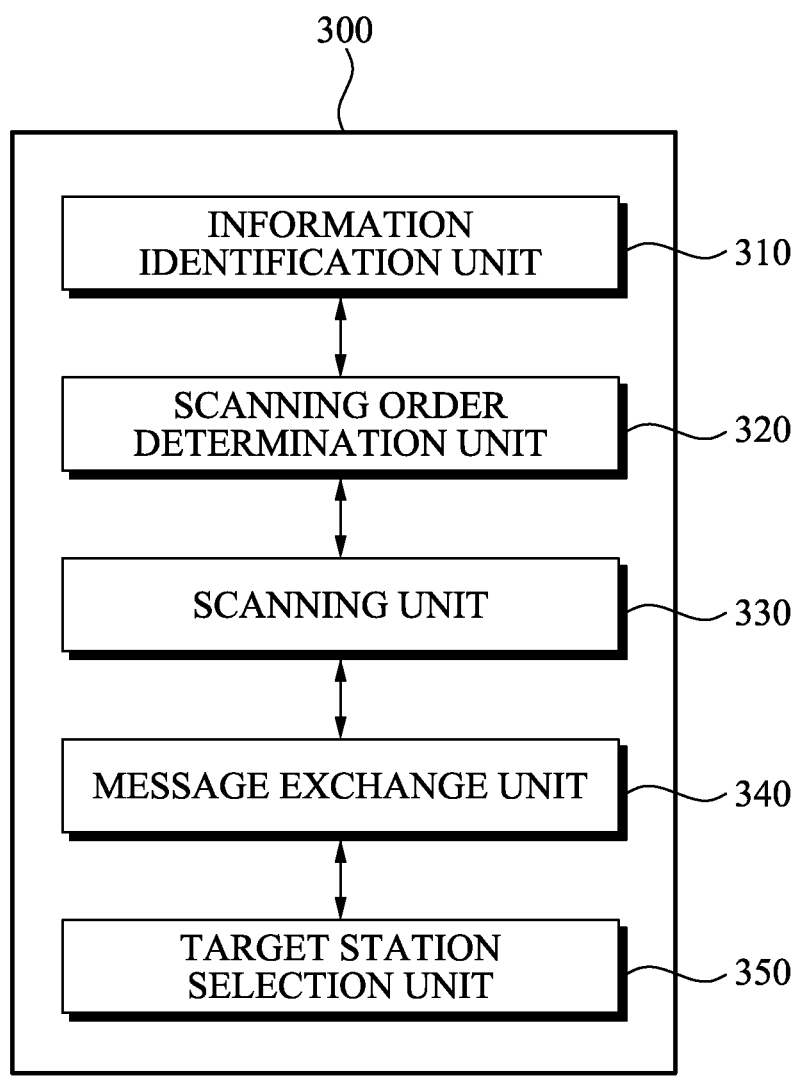
FIG. 3 is a block diagram illustrating an example of a handover control apparatus.

FIG. 3 illustrates an example of a handover control apparatus 300.

As illustrated in FIG. 3, the handover control apparatus 300 includes an information identification unit 310, a scanning order determination unit 320, a scanning unit 330, a message exchange unit 340, and a target station selection unit 350.

The information identification unit 310 ascertains movement direction information of a terminal and location information of a plurality of neighboring RASs adjacent to the terminal. The information identification unit 310 may ascertain the a movement direction of the terminal using the movement direction information of the terminal, and ascertain a relative location of each of the plurality of neighboring RASs with respect to the terminal using the location information of each of the plurality of neighboring RASs.

The scanning order determination unit 320 determines a scanning order for handover with respect to the plurality of neighboring RASs using the movement direction information of the terminal and the location information of the plurality of neighboring RASs.

In this instance, the scanning order determination unit 320 may determine whether a location of each of the plurality of neighboring RASs corresponds to the movement direction of the terminal using the movement direction information of the terminal and the location information. The scanning order determination unit 320 may assign a priority to at least one neighboring RAS corresponding to the movement direction of the terminal from among the plurality of neighboring RASs based on a result of the determination, and thereby may determine the scanning order.

Accordingly, since the terminal may first scan a neighboring RAS located in a location corresponding to the movement direction, the terminal may scan efficiently.

Also, the scanning order determination unit 320 may determine the scanning order according to a distance between the terminal and each of the plurality of neighboring RASs. That is, the scanning order determination unit 320 may determine the scanning order considering the distance and whether the neighboring RASs are located in the location corresponding to the movement direction of the terminal.

The scanning unit 330 scans the plurality of neighboring RASs according to the determined scanning order and detects at least one candidate RAS satisfying a handover condition from among the plurality of neighboring RASs.

In this instance, the scanning unit 330 may sequentially measure a Carrier to Interference and Noise Ratio (CINR) with respect to the plurality of neighboring RASs according to the determined scanning order, and detect the at least one candidate RAS using the measured CINR.

For example, where it is assumed that neighboring RASs A, B, and C exist, and a scanning order is determined in an order of A, B, and C, the scanning unit 330 may scan the neighboring RAS A and measure a CINR with respect to the neighboring RAS A. Where the measured CINR is greater than a threshold value, the scanning unit 330 may detect the neighboring RAS A as the candidate RAS. Where the measured CINR is equal to or less than a threshold value, the scanning unit 330 may not determine the neighboring RAS A as the candidate RAS and measure a CINR with respect to the neighboring RAS B according to the predetermined scanning order.

The scanning unit 330 may sequentially scan the plurality of neighboring RASs according to the scanning order until a predetermined number of candidate RASs is detected.

As described above, where the scanning order is determined in the order of A, B, and C, and the neighboring RASs A, B, and C exist, the scanning unit 330 may detect the neighboring RASs A, B, and C according to the scanning order until two candidate RASs are detected. It is assumed that the scanning unit 330 sequentially scans the neighboring RAS A and neighboring RAS B, and determines that the neighboring RAS A and neighboring RAS B are the candidate RASs satisfying the handover condition. In this case, the scanning unit 330 may not scan the neighboring RAS C since the two candidate RASs, that is, the neighboring RAS A and neighboring RAS B, are detected.

The message exchange unit 340 transmits a handover request message to the at least one candidate RAS detected, and receives a handover response message corresponding to the handover request message from the at least one candidate RAS detected.

The message exchange unit 340 may transmit the handover request message to the candidate RAS via a serving RAS connected to a current terminal, and receive the handover response message via the serving RAS.

Also, the handover request message may include information associated with the candidate RAS, and the handover response message may be generated in response to the handover request message from the at least one candidate RAS.

An example of an operation of the message exchange unit 340 is described in detail with reference to FIGS. 5 and 6.

The target station selection unit 350 selects any one from the at least one candidate RAS as a target handover RAS based on the received handover response message.

Where a single candidate RAS exists, the target station selection unit 350 selects the candidate RAS as the target handover RAS. However, where a plurality of candidate RASs exist, the target station selection unit 350 may select any one of the plurality of candidate RASs as the target handover RAS.

The target station selection unit 350 may select the target handover RAS according to various standards. As an illustration, the target station selection unit 350 may select the target handover RAS by considering a scanning order with respect to the plurality of candidate RASs. For example, a candidate RAS corresponding to a first scanned RAS based on a scanning order may be selected as the target handover RAS.

Although it is not illustrated in FIG. 3, where the handover control apparatus 300 is separated from a terminal and installed in a serving RAS or another place, the handover control apparatus 300 may further include an order information transmission unit. The order information transmission unit transmits order information associated with the determined scanning order.

Figure 4:
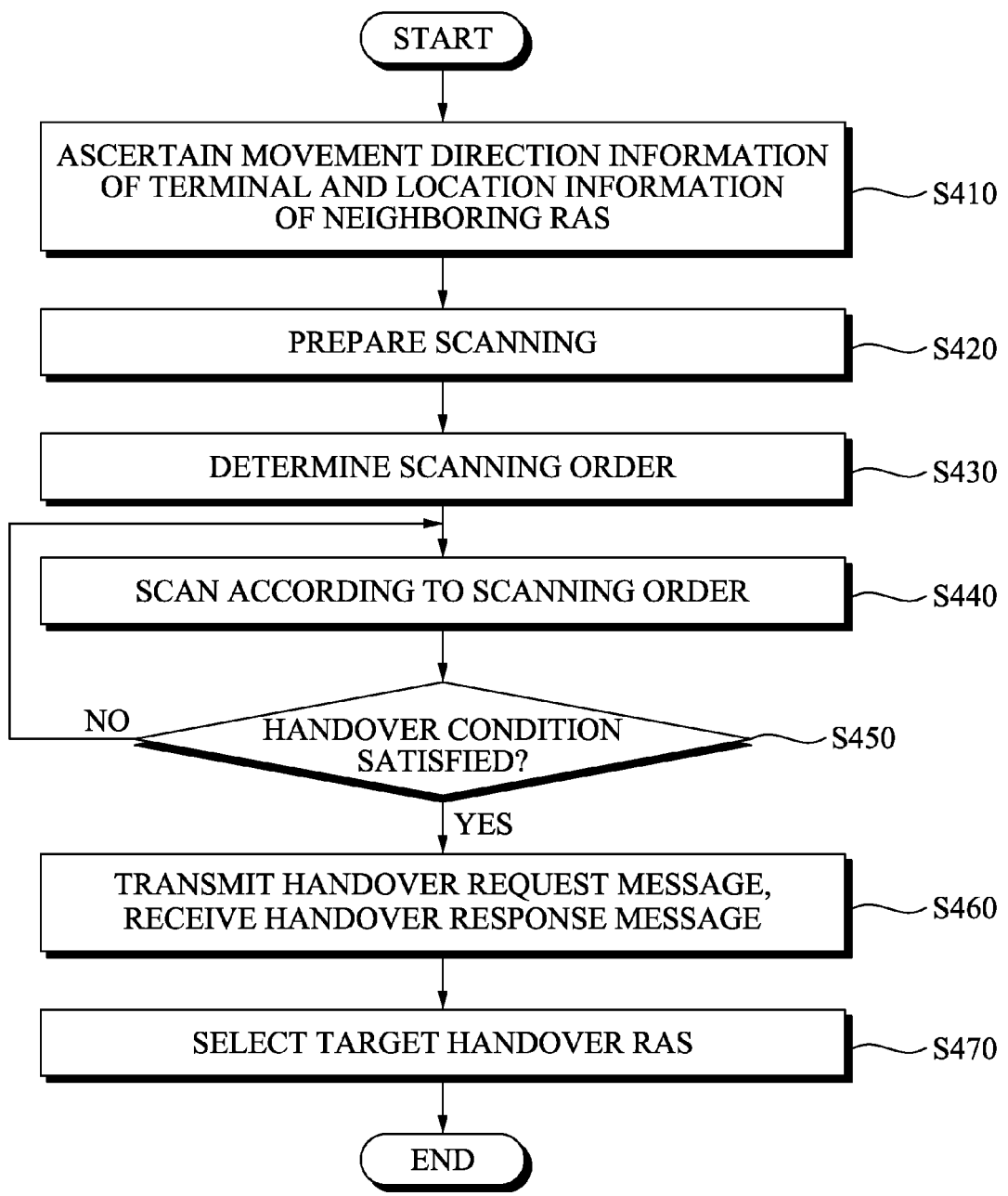
FIG. 4 is a flowchart illustrating an example of a method of a handover control apparatus.

FIG. 4 illustrates an example of an operation method of a handover control apparatus.

As illustrated in FIG. 4, in operation S410, a handover control apparatus ascertains movement direction information of a terminal and location information of a plurality of neighboring RASs adjacent to the terminal.

The location information of the plurality of neighboring RASs may be periodically broadcasted from a serving RAS connected to the terminal.

In operation S420, where a handover is requested, the handover control apparatus transmits a scanning start request message to the serving RAS, and receives a scanning start response message corresponding to the scanning start request message from the serving RAS in order to prepare for scanning.

The scanning start response message may include cell parameter information of the plurality of neighboring RASs.

In operation S430, the handover control apparatus determines a scanning order for handover with respect to the plurality of neighboring RASs using the movement direction information of the terminal and the location information of the plurality of neighboring RASs.

An example of a determining operation has been described with reference to FIGS. 2 and 3.

In operation S440, the handover control apparatus scans the plurality of neighboring RASs according to the determined scanning order.

In operation S450, the handover control apparatus determines whether the scanned neighboring RAS is a candidate RAS satisfying a handover condition.

For example, the terminal may first scan a first neighboring RAS, and determine whether the first neighboring RAS satisfies the handover condition. Whether the handover condition is satisfied may be determined depending on whether a CINR, measured with respect to the first neighboring RAS, is greater than a predetermined threshold value. Where it is determined that the first neighboring RAS satisfies the handover condition, the terminal may not scan a second neighboring RAS. Where it is determined that the first neighboring RAS does not satisfy the handover condition, the terminal scans the second neighboring RAS.

Accordingly to a general aspect, at least two candidate RASs may be detected. For example, where the first neighboring RAS is selected as the candidate RAS, the terminal scans the second neighboring RAS according to the scanning order, and thereby may determine whether the second neighboring RAS satisfies the handover condition. Where it is determined that the second neighboring RAS does not satisfy the handover condition, the terminal may scan a third neighboring RAS. In this case, the terminal determines whether the third neighboring RAS satisfies the handover condition, and where it is determined that the third neighboring RAS satisfies the handover condition, the terminal may no longer perform the scanning operation. Where it is determined that the third neighboring RAS does not satisfy the handover condition, the terminal may scan a fourth neighboring RAS, and thereby may determine whether the fourth neighboring RAS satisfies the handover condition. That is, the terminal may detect two candidate RASs, and where the two candidate RASs are detected, the terminal may no longer scan other neighboring RASs.

In operation S460, the handover control apparatus transmits a handover request message to the at least one candidate RAS satisfying the handover condition, and receives a handover response message corresponding to the handover request message. In operation S460, the handover request message and the handover response message may be transmitted and received via a serving RAS.

In operation S470, the handover control apparatus selects any one of the at least one candidate RAS as a target handover RAS based on the received handover response message.

Where at least two candidate RASs exist, the target handover RAS may be selected by considering the scanning order. For example, where candidate RASs A, B, and C exist, and the scanning order is determined to be A, B, and C, the candidate RAS A may be selected as the target handover RAS.

Figure 5:
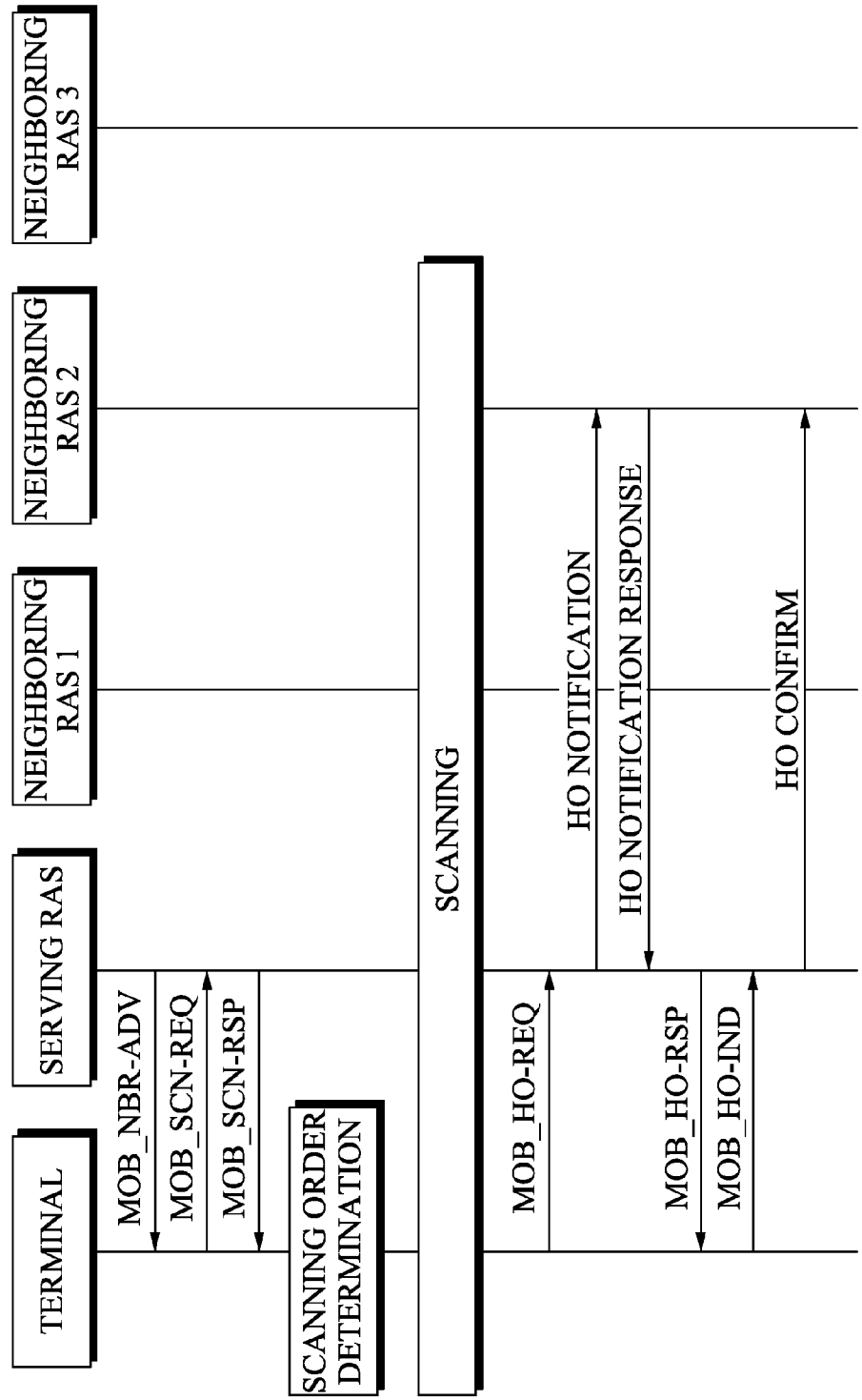
FIG. 5 is a diagram illustrating an example of a method of a terminal and RASs.

FIG. 5 illustrates an example of operations of a terminal and RASs.

Referring to FIG. 5, a terminal, a serving RAS, a neighboring RAS (RAS1), a neighboring RAS (RAS2), and a neighboring RAS (RAS3) are illustrated.

A handover procedure may include an operation of obtaining network topology and an operation of performing handover. The terminal periodically communicates with the serving RAS in the operation of obtaining network topology, and obtains or updates parameter values required where a handover is performed.

The serving RAS periodically broadcasts an advertising message MOB_NBR-ADV to a cell area of the serving RAS. The advertising message MOB_NBR-ADV includes location information about neighboring RASs and a number of the neighboring RASs.

Where a handover is required, the terminal transmits a scanning start request message MOB_SCN-REQ to the serving RAS, and receives a scanning start response message MOB_SCN-RSP corresponding to the scanning start request message MOB_SCN-REQ.

The terminal receiving the scanning start response message MOB_SCN-RSP determines a scanning order with respect to the neighboring RAS1, neighboring RAS2, and neighboring RAS3. The terminal determines the scanning order of the neighboring RAS1, neighboring RAS2, and neighboring RAS3 based on location information about each of the neighboring RAS1, neighboring RAS2, and neighboring RAS3, a location, and a movement direction of the terminal.

The terminal may ascertain projection values corresponding to the neighboring RAS1, neighboring RAS2, and neighboring RAS3 by projecting each of the neighboring RAS1, neighboring RAS2, and neighboring RAS3 with respect to an axis corresponding to the movement direction of the terminal. The terminal may determine the scanning order with respect to the neighboring RAS1, neighboring RAS2, and neighboring RAS3 using the projection values.

Hereinafter, an operation of the serving RAS, the neighboring RAS1, neighboring RAS2, and neighboring RAS3 is described with assumptions that the scanning order is determined in an order of the neighboring RAS1, neighboring RAS2, and neighboring RAS3.

The terminal first scans the neighboring RAS1 according to the determined scanning order. Also, the terminal confirms whether the neighboring RAS1 satisfies a handover condition. Here, it is assumed that the neighboring RAS1 does not satisfy the handover condition since a CINR, measured with respect to the neighboring RAS1, is less than a predetermined threshold value.

In this case, the terminal scans the neighboring RAS2 according to the determined scanning order. Here, it is assumed that the neighboring RAS2 satisfies the handover condition since a CINR, measured with respect to the neighboring RAS2, is greater than the predetermined threshold value. In this case, the terminal stops scanning before scanning the neighboring RAS3, and performs an operation for a handover to the neighboring RAS2.

That is, the terminal transmits a handover request message MOB_HO-REQ to the serving RAS. The handover request message MOB_HO-REQ is generated in the terminal so that the terminal performs a handover to a candidate RAS detected through the scanning operation. The handover request message MOB_HO-REQ may include information associated with the candidate RAS such as the CINR measured with respect to the candidate RAS, and the like. The handover request message MOB_HO-REQ may be a protocol message between Medium Access Control (MAC) layers.

The serving RAS receiving the handover request message MOB_HO-REQ transmits a handover notification message HO_notification to the neighboring RAS2. The neighboring RAS2 receiving the handover notification message HO_notification transmits a handover notification response message HO_notification response corresponding to the handover notification message HO_notification to the serving RAS. The handover notification response message HO_notification response may include bandwidth information provided by the neighboring RAS2, service level information, and the like.

The serving RAS receiving the handover notification response message HO_notification response transmits a handover response message MOB_HO-RSP corresponding to the handover notification response message HO_notification response to the terminal.

The terminal receiving the handover response message MOB_HO-RSP transmits a handover indication message MOB_HO-IND to the serving RAS. The handover indication message MOB_HO-IND indicates that a handover to the neighboring RAS2 which is a target handover RAS is to be performed.

The serving RAS receiving the handover indication message MOB_HO-IND transmits a handover confirmation message HO-confirm to the neighboring RAS2. The handover confirmation message HO-confirm reports that the handover to the neighboring RAS2 will be performed by the terminal.

Figure 6:
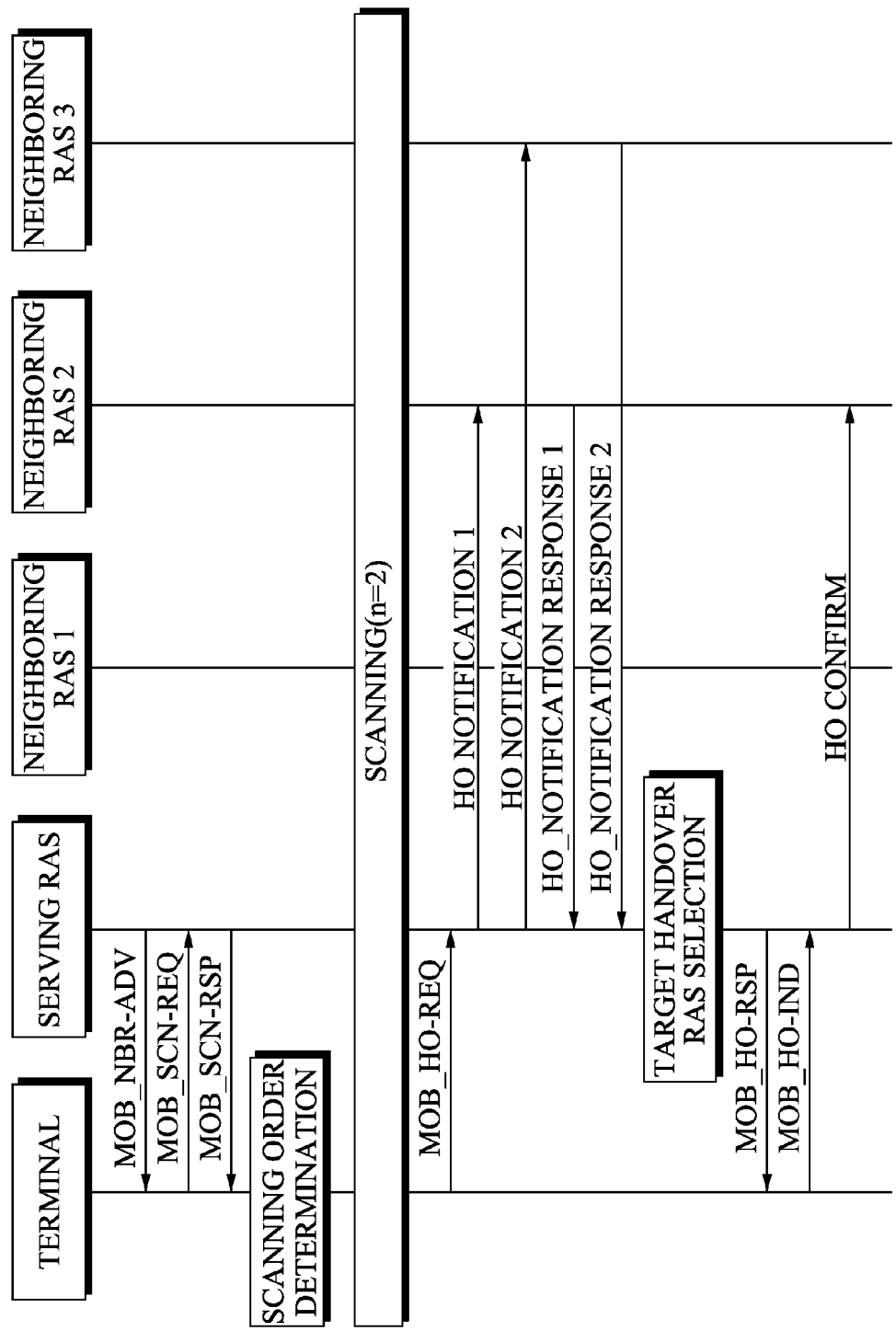
FIG. 6 is a diagram illustrating another example of a method of a terminal and RASs.

FIG. 6 illustrates an example of operations of a terminal and RASs according to another general aspect.

Referring to FIG. 6, an operation in which a terminal scans neighboring RASs until a predetermined number (n=2) of candidate RASs satisfying a handover condition is detected, is illustrated.

Since operations of transmitting/receiving an advertising message MOB_NBR-ADV, a scanning start request message MOB_SCN-REQ, and a scanning start response message MOB_SCN-RSP by the terminal and a serving RAS have been described with reference to FIG. 6, it is omitted herein. In this embodiment, it is assumed that a scanning order is determined as a neighboring RAS1, neighboring RAS2, and neighboring RAS3.

The terminal scans the neighboring RAS1, neighboring RAS2, and neighboring RAS3 according to the scanning order. The terminal sequentially scans the neighboring RAS1, neighboring RAS2, and neighboring RAS3 until two candidate RASs satisfying the handover condition are detected. It is further assumed that the neighboring RAS1 does not satisfy the handover condition, and the neighboring RAS2 and neighboring RAS3 satisfy the handover condition.

The terminal first scans the neighboring RAS1. Since the neighboring RAS1 does not satisfy the handover condition, the terminal scans the neighboring RAS2 according to the scanning order. Although the neighboring RAS2 satisfies the handover condition, the terminal scans the neighboring RAS3 according to the scanning order since the number of candidate RAS satisfying the handover condition is one. Since the neighboring RAS3 satisfies the handover condition, and the number of candidate RAS satisfying the handover condition is two, and accordingly, the terminal no longer scans.

The terminal which finishes scanning transmits a handover request message MOB_HO-REQ to a serving RAS. In this instance, the handover request message MOB_HO-REQ may include information which indicates the candidate RASs satisfying the handover condition are the neighboring RAS2 and neighboring RAS3. The handover request message MOB_HO-REQ may include information associated with the scanning order, computed by the terminal, of neighboring RASs.

The serving RAS receiving the handover request message MOB_HO-REQ transmits handover notification messages HO-notification1 and HO-notification2 to the neighboring RAS2 and neighboring RAS3, respectively. Also, the neighboring RAS2 and neighboring RAS3 receiving the handover notification messages HO-notification1 and HO-notification2 transmit handover notification response messages HO-notification response1 and HO-notification response2 corresponding to the handover notification messages HO-notification1 and HO-notification2 to the serving RAS, respectively. The handover notification response messages HO-notification response1 and HO-notification response2 may include information associated with whether the neighboring RAS2 and neighboring RAS3 may be a target handover RAS, bandwidth information, and service level information provided by the neighboring RAS2 and neighboring RAS3.

The serving RAS receiving the handover notification response messages HO-notification response1 and HO-notification response2 from the neighboring RAS2 and neighboring RAS3 determines the target handover RAS considering the scanning order. That is, where the serving RAS receives the handover notification response messages HO-notification response1 and HO-notification response2 from the neighboring RAS2 and neighboring RAS3, the serving RAS selects the neighboring RAS2, which is scanned prior to the neighboring RAS3, as the target handover RAS.

Here, information required to select the target handover RAS may be provided by the terminal. For example, the information may be included in the scanning start request message MOB_SCN-REQ transmitted by the terminal.

Where the serving RAS selects the target handover RAS, the serving RAS transmits a handover response message MOB_HO-RSP corresponding to the handover request message MOB_HO-REQ to the terminal.

The terminal receiving the handover response message MOB_HO-RSP transmits a handover indication message MOB_HO-IND to the serving RAS. The handover indication message MOB_HO-IND indicates that a handover to the neighboring RAS2, which is a target handover RAS, is to be performed. The serving RAS receiving the handover indication message MOB_HO-IND transmits a handover confirmation message HO-confirm to the neighboring RAS2. The handover confirmation message HO-confirm reports that the handover to the neighboring RAS2 will be performed by the terminal.

The above-described examples of methods of a handover control apparatus may be recorded, stored, or fixed in one or more computer-readable media that includes program instructions to be implemented by a computer to case a processor to execute or perform the program instructions. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations described above.

A number of general aspects have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A handover control apparatus, comprising:
an information identification unit of a terminal, the information identification unit being configured to ascertain a direction of movement of the terminal, and a location of each of neighboring radio access stations (RASs); and
a scanning order determination unit of the terminal, the scanning order determination unit being configured to
determine whether the location of each of the neighboring RASs is in a same direction as the direction of movement of the terminal, and
determine an order of scanning the neighboring RASs for a handover based on a distance between the terminal and at least one of the neighboring RASs in response to the location of the at least one of the neighboring RASs being determined to be in the same direction as the direction of movement of the terminal.

2. The handover control apparatus of claim 1, further comprising a scanning unit of the terminal, the scanning unit being configured to:
scan the neighboring RASs based on the order of scanning the neighboring RASs; and
detect one or more candidate RASs satisfying a handover condition from the neighboring RASs.

3. The handover control apparatus of claim 2, wherein the scanning unit is configured to sequentially scan the neighboring RASs based on the order of scanning the neighboring RASs until a predetermined number of the one or more candidate RASs is detected.

4. The handover control apparatus of claim 3, wherein the scanning unit is configured to:
  sequentially measure a carrier to interference and noise ratio (CINR) of at least one of the neighboring RASs based on the order of scanning the neighboring RASs; and
  detect the one or more candidate RASs based on the CINR.

5. The handover control apparatus of claim 1, wherein the scanning order determination unit is configured to:
  assign a priority to the at least one of the neighboring RASs in response to the location of the at least one of the neighboring RASs being determined to be in the same direction as the direction of movement of the terminal; and
  determine the order of scanning the neighboring RASs based on the priority.

6. The handover control apparatus of claim 1, further comprising an order information transmission unit of a serving RAS connected to the terminal, the order information transmission unit being configured to transmit the order of scanning the neighboring RASs to the terminal.

7. The handover control apparatus of claim 2, further comprising a message exchange unit of the terminal, the message exchange unit being configured to:
  transmit a handover request message to the one or more candidate RASs; and
  receive a handover response message corresponding to the handover request message from the one or more candidate RASs.

8. The handover control apparatus of claim 7, further comprising a target station selection unit of the terminal, the target station selection unit being configured to select one of the one or more candidate RASs as a target handover RAS based on the handover response message.

9. The handover control apparatus of claim 7, further comprising:
  a target station selection unit of a serving RAS connected to the terminal, the target station selection unit being configured to select one of the one or more candidate RASs as a target handover RAS based on the order of scanning the neighboring RASs,
  wherein
  the location of each of the neighboring RASs is periodically broadcasted from the serving RAS, and
  the message exchange unit is further configured to transmit the handover request message, and receive the handover response message, via the serving RAS.

10. An operation method of a handover control apparatus, the operation method comprising:
  ascertaining, by a terminal, a direction of movement of the terminal, and a location of each of neighboring radio access stations (RASs);
  determining, by the terminal, whether the location of each of the neighboring RASs is in a same direction as the direction movement of the terminal; and
  determining, by the terminal, an order of scanning the neighboring RASs for a handover based on a distance between the terminal and at least one of the neighboring RASs in response to the location of the at least one of the neighboring RASs being determined to be in the same direction as the direction of movement of the terminal.

11. The operation method of claim 10, further comprising:
  scanning, by the terminal, the neighboring RASs based on the order of scanning the neighboring RASs; and
  detecting, by the terminal, one or more candidate RASs satisfying a handover condition from the neighboring RASs.

12. The operation method of claim 11, wherein the scanning of the neighboring RASs comprises sequentially scanning the neighboring RASs based on the order of scanning the neighboring RASs until a predetermined number of the one or more candidate RASs is detected.

13. The operation method of claim 12, wherein the detecting of the one or more candidate RASs comprises:
  sequentially measuring a carrier to interference and noise ratio (CINR) of at least one of the neighboring RASs based on the order of scanning the neighboring RASs; and
  detecting the one or more candidate RASs based on the CINR.

14. The operation method of claim 10, wherein the determining of the scanning order comprises:
  assigning a priority to the at least one of the neighboring RASs in response to the location of the at least one of the neighboring RASs being determined to be in the same direction as the direction of movement of the terminal; and
  determining the order of scanning the neighboring RASs based on the priority.

15. The operation method of claim 10, further comprising transmitting, by a serving RAS connected to the terminal, the order of scanning the neighboring RASs to the terminal.

16. The operation method of claim 11, further comprising:
  transmitting, by the terminal, a handover request message to the one or more candidate RASs; and
  receiving, by the terminal, a handover response message corresponding to the handover request message from the one or more candidate RASs.

17. The operation method of claim 16, further comprising selecting, by the terminal, one of the one or more candidate RASs as a target handover RAS based on the handover response message.

18. The operation method of claim 16, further comprising:
  selecting, by a serving RAS connected to the terminal, one of the one or more candidate RASs as a target handover RAS based on the order of scanning the neighboring RASs; and
  periodically broadcasting, by the serving RAS, the location of each of the neighboring RASs,
  wherein the transmitting of the handover request message, and the receiving of the handover response message, are performed via the serving RAS.

19. A non-transitory computer-readable recording medium storing a program for implementing an operation method of a handover control apparatus, the operation method comprising:
  ascertaining, by a terminal, a direction of movement of the terminal, and a location of each of neighboring radio access stations (RASs);
  determining, by the terminal, whether the location of each of the neighboring RASs is in a same direction as the direction movement of the terminal; and
  determining, by the terminal, an order of scanning the neighboring RASs for a handover based on a distance between the terminal and at least one of the neighboring RASs in response to the location of the at least one of the neighboring RASs being determined to be in the same direction as the direction of movement of the terminal.

20. The handover control apparatus of claim 9, wherein the handover response message indicates that a handover to an identified one of the one or more candidate RASs is to be performed.

21. The handover control apparatus of claim 5, wherein the scanning order determination unit is further-configured to determine the at least one of the neighboring RASs that is assigned the priority and located in the same direction as the direction of movement of the terminal, to be scanned before the neighboring RASs that are not assigned the priority, in the order of scanning the neighboring RASs.

22. The handover control apparatus of claim 1, wherein the scanning order determination unit is configured to determine the at least one of the neighboring RASs that is located in the same direction as the direction of movement of the terminal, to be scanned in an order of nearest to farthest in distance from the terminal, in the order of scanning the neighboring RASs.

23. The handover control apparatus of claim 1, wherein the scanning order determination unit is configured to:
- project the location of each of the neighboring RASs onto an axis corresponding to the direction of movement of the terminal;
- determine whether the projected location of each of the neighboring RASs is in the same direction as the direction of movement of the terminal; and
- determine the order of scanning the neighboring RASs based on a result of the determination of whether the projected location of each of the neighboring RASs is in the same direction as the direction of movement of the terminal.

24. The handover control apparatus of claim 1, further comprising a scanning unit of the terminal, the scanning unit being configured to:
- scan one of the neighboring RASs based on the order of scanning the neighboring RASs;
- determine whether the one of the neighboring RASs satisfies a handover condition;
- cease scanning of the neighboring RASs in response to the one of the neighboring RASs being determined to satisfy the handover condition; and
- scan another one of the neighboring RASs based on the order of scanning the neighboring RASs in response to the one of the neighboring RASs being determined to not satisfy the handover condition.

* * * * *